United States Patent [19]

Deno et al.

[11] Patent Number: 4,946,229
[45] Date of Patent: Aug. 7, 1990

[54] ADAPTIVE AIR BRAKE CONTROL SYSTEM

[75] Inventors: Milton C. Deno, Satellite Beach; Eugene A. Smith, Jr., Palm Bay; Dale H. Delaruelle, Melbourne, all of Fla.

[73] Assignee: Harris Corporation, Melbourne, Fla.

[21] Appl. No.: 360,417

[22] Filed: Jun. 2, 1989

Related U.S. Application Data

[63] Continuation of Ser. No. 232,466, Aug. 15, 1988, Pat. No. 4,859,000.

[51] Int. Cl.$^5$ ............................................. B60T 15/22
[52] U.S. Cl. ...................................... 303/33; 303/20; 303/70
[58] Field of Search ...................... 303/20, 32, 33, 36, 303/39, 45, 70, 80, 82, 83

[56] References Cited

U.S. PATENT DOCUMENTS

| | | | |
|---|---|---|---|
| 4,378,950 | 4/1983 | Hart et al. | 303/36 |
| 4,492,412 | 1/1985 | Wickham et al. | 303/32 |
| 4,678,241 | 7/1987 | Tamamori et al. | 303/33 |

Primary Examiner—Duane A. Reger
Attorney, Agent, or Firm—Antonelli, Terry & Wands

[57] ABSTRACT

An adaptive brake control system monitors a plurality of brake pipe/air line parameters, such as fluid path volume and air flow rate, and controllably modifies action taken by the engineman or performs emergency control of the brakes, in order to continuously enable the brake system to adapt itself to dynamic operating conditions and anomalies in the integrity of the fluid path. In accordance with a pressure reduction modification mechanism, the application of a pressure reduction to the equalizing reservoir is precisely controlled by taking into account the actual state of the brake pipe, so as to ensure that the requested brake application is effected as intended. The control mechanism also monitors the integrity of the fluid flow path of the brake pipe/train air line, so that the engineman may be alerted and a prescribed train safety measure may be effected in the event of a potentially hazardous anomaly in the link. It also provides the engineman with a precise indication that the brake of the train have been fully released or applied.

33 Claims, 7 Drawing Sheets

ADAPTIVE AIR BRAKE CONTROL SYSTEM

CROSS REFERENCE TO RELATED APPLICATIONS

The present application is a continuation of an application Ser. No. 232,466 filed Aug. 15, 1988 entitled "Adaptive Air Brake Control System", and assigned to the Assignee of the present application Now U.S. Pat. No. 4,859,000, issued Aug. 22, 1989.

FIELD OF THE INVENTION

The present invention relates in general to air brake systems for railroad trains and is particularly directed to a control mechanism for ensuring effective braking action in accordance with prescribed operational characteristics of the brake system.

BACKGROUND OF THE INVENTION

One of the most critical aspects of the control of the operation of railway vehicles, particularly freight trains, is the predictable successful operation of the air brake system. The air brake system is subjected to a variety of dynamic effects, not only as a result of the controlled application and release of brake pipe pressure in response to varying conditions encountered by the train, but as a result of the occurrence of unpredictable anomalies in the integrity of the brake system itself.

More particularly, with reference to FIG. 1, which diagrammatically illustrates a typical air brake system employed by a railway freight train, the application and release of braking action is generally controlled by the engineman within locomotive equipment 10. Locomotive 10 contains an air brake control system including a controllably pressurized brake pipe 101, which is coupled (via one of a series of cut-out valves 120) to the serial train air line 201, through which air brake pressure is supplied for each of the cars 20 of the train. The air brake control system also includes an air supply input link 111 for supplying, under pressure, fluid (air) through which the brake pipe and train air line are charged, for controlling the operation of the pneumatically operated brake mechanisms at the wheels of the train.

Coupled within air supply input link 111, for measuring the charging rate (in terms of air supply pressure) of the brake pipe supply air are an air flow measuring adaptor 113 and an associated differential pressure gauge 115. Air supply link 111 is coupled to a first, input port 121 of a relay valve 117 and a second, bidirectional port 122 of which is coupled to the brake pipe 101. Relay valve further includes a third port 123 which is coupled through an air pressure control link 103 to an equalizing reservoir 105 and an equalizing reservoir pressure control unit 107 through which the line 103 and equalizing reservoir 105 are controllably charged and discharged in the course of a braking operation. A fourth port 124 of relay valve 117 is controllably vented to the atmosphere as an exhaust port. Coupled with brake pipe 101 and air pressure control link 103 are respective pressure measuring gauges 131 and 133 through which the pressure in the brake pipe 101 and that in the air pressure control link 103 are monitored.

The brake control unit within a typical car 20 of the train includes a control valve 203, a first port 221 of which is coupled to the train air line 201. Control valve 203 has a second port 222 coupled to pressure storage and reference reservoir(s) 205, and a third port 223 which is coupled to the actual brake cylinder 231 that controls the movement of the brake shoes 233 relative to the wheels 235 of the car.

In operation, the cut-out valve 120, through which the brake pipe 101 and successive segments of the train air line 201 are coupled in serial fluid communication, are assumed to be fully open, so that there will be a continuous brake/air line fluid path between the locomotive equipment 10 and all of the cars 20 of the train. The brake system is initially pressurized by the operation of pressure control unit 107, which couples the air supply to line 103, so as to fully charge equalizing reservoir 105. Relay valve 117 is then operated to couple port 121 with port 122, so that air is supplied therethrough to brake pipe 101 and thereby to the train air line 201, in order to charge the brake pipe/air line fluid path 101/201 to its maximum charging pressure, as established by the pressure (for example, 85 psi.) of equalizing reservoir 105 within locomotive equipment 10. Namely, the pressure within the brake pipe 101 (and train air line 201) is determined to have reached the maximum, as established by the fully charged equalizing reservoir 105, when the pressure at port 122 matches the pressure at port 123. Through control valves 203 in each of the cars 20 of the train, pressure storage and reference reservoirs 205 are fully charged, to thereby establish a reference pressure for maximum withdrawal of the piston of each brake cylinder 231 and thereby complete release of the brakes for each of the cars 20.

When the engineman desires to apply brakes to the wheels of the train cars, he operates pressure control unit 107, typically via a handle-operated pneumatic control valve, which is coupled to the air pressure control link 103. Operation of pressure control unit 107 will cause a partial venting of air pressure control link 103 and thereby a reduction in the pressure within equalizing reservoir 105 (through link 103). This reduction in pressure in the equalizing reservoir 105 is sensed by relay valve 117 (via port 123) which, in turn, causes its bidirectional port 122 to be coupled to exhaust port 124 and thereby vent the brake pipe 101 to the atmosphere until the brake pipe pressure equals the pressure of equalizing reservoir 105. Because of the considerably larger volume of the fluid path through the brake pipe/train air line linkage 101/201, the length of time required for air pressure within the brake pipe/air line to drop to the pressure in the equalizing reservoir 105 is significantly longer than the time required for a reduction in air pressure in the equalizing reservoir 105, which takes place quickly in response to the operation of pressure control unit 107.

As the pressure in the brake pipe 101 and, correspondingly, within train air line 201, drops, the respective control valves 203 in each of the cars 20 senses the pressure reduction in the train air line 201 by comparing brake pipe pressure, in line 201, with the pressure in the pressure storage and reference reservoir 205, and causes a corresponding increase in the pressure applied to the brake cylinders 231, resulting in an application of brakes to the wheels in proportion to the sensed pressure reduction in train air line 201. Further pressure reductions in the equalizing reservoir 105 by the engineman produce corresponding pressure reductions in the train air line 201 and, thereby, additional braking effort by the brake mechanisms in each of the cars 20. In other words, for the intended operation of the brake system, the braking effort applied in each of the cars is proportional to the reduction in pressure in the equalizing reservoir 105 within the locomotive equipment 10.

When the engineman desires to release the brakes, he operates pressure control unit 107 to effect a recharging of the system, to bring the pressure within equalizing reservoir back up to its fully charged state, as described previously. With equalizing reservoir 105 recharged, there is again a pressure differential (but opposite to the previous drop in the pressure in line 103) between ports 122 and 123, which is sensed by relay valve 117. Valve 117 thereby couples air supply link 111 to brake pipe 101, so as to recharge and thereby increase the pressure in the brake pipe/train air line 101/201. This increase in pressure within the train air line 101/201 is sensed by the control valves 203 in each of cars 20, so as to cause the brakes to be released.

During normal operation, the application and release of brakes is controlled in accordance with the above-described sequence of events. However, there may be circumstances, dictated either by action taken by the engineman or by other unpredictable events, which create the potential for unsafe operation of the braking system. One of these conditions occurs as a result of the engineman applying braking subsequent to the release of a previous brake application, but prior to the system having been fully recharged and pressure within the brake pipe/air line fluid path stabilized.

More specifically, when the engineman initiates a release of the brakes of the train after a previous braking application, air for charging the brake system is input through the air supply link 111 and relay valve 117, so as to recharge the brake pipe 101 and the train air line 201, as pointed out above. During this brake release/air line charging interval, the pressure within the brake pipe 101 rises slowly (compared with the rapid rate of charge of equalizing reservoir 105, which has been recharged by the operation of pressure control unit 107) until it equals the pressure of link 103, at which time relay valve 117 interrupts the connection of the air supply link 111 to the brake pipe 101, as the train air line 201 is now fully charged.

If, prior to the brake pipe 101 and train air line 201 becoming fully charged, the engineman initiates a new brake application (by reducing the pressure in the equalizing reservoir 105 via operation of pressure control unit 107), the pressure differential between the partially charged train air line 201 and pressure storage reservoirs 205 in each of cars 20 will be different than the pressure differential intended by the pressure reduction newly applied to equalizing reservoir 105. As a consequence, each of control valves 203 will sense a smaller pressure differential between ports 221 and 222 than the drop applied to equalizing reservoir 105, so that the braking effort imparted to brake cylinders 231 in each of cars 20 will be less than what the engineman has requested. If not immediately recognized by the engineman, this "reduced-effort" braking application can create a potentially unsafe condition of the train.

Still, even when he recognizes the insufficiency of the new braking application, the engineman often attempts to remedy the problem by a further incremental reduction in the pressure in the equalizing reservoir 105. Again, however, the application of only a partial braking effort described above will take place, so that there may still be inadequate braking action applied by the cars of the train. Simply put, if the engineman tries to make up for insufficient braking of one pressure reduction request in a piecemeal fashion, and fails each time, it is possible that continuing efforts in this process will be unsuccessful and the originally intended braking effort will never be accomplished.

An experienced engineman (in terms of the train and conditions the train currently encounters), upon realizing the unsafe condition, may apply a severe pressure reduction in an effort to make up for the original lack of braking response to the pressure reduction of an incompletely charged system. Still, the action taken by the engineman is only a guess; a guess (even an educated one) as to whether a further braking effort will successfully brake the train cannot be equated with safe train operation.

Another circumstance in which a 'guesstimate' braking control procedure is used is in the course of determining when the train air line is fully charged, so that the brakes are fully released and a motive traction force can be applied to the train. For this purpose, a practice commonly employed by the engineman is his interpretation of the sound of air passing through the brake relay valve to determine when the brakes are fully released or when the train air line is fully charged. In effect, this practice constitutes a "seat of the pants" procedure which is not necessarily reliable.

As pointed out above, in addition to potential safety hazards that arise as the result of the application of insufficient brake control pressure reductions by the engineman (due, for example, to an unexpected dynamic event), the integrity of the train air line is subject to unforeseeable changes (such as a cut out valve being accidentally hit or tampered with, resulting in a change in air line continuity) which, if remained undetected, could permit the brakes to be applied normally to one part of the train but not applied or only partially applied to another part of the train. The need for qualifying the integrity of the air line is especially important when the engineman proceeds to cut the engine off from the rest of the train at a destination or for switching purposes. In the course of this procedure, the engineman will normally initiate a full service brake application on the train, so as to lock the wheels of the cars. After applying a full service input to the pressure control unit 107, the enginemen will wait for some period of time until the brake pressure application has propagated down the entire train and the air exhaust port 124 of relay valve 117 has ceased venting brake pipe pressure to the atmosphere. Once the engineman is satisfied that the air pressure has been completely released by listening to what he considers to be the last venting of air from the exhaust port of relay valve 117, he then proceeds to disconnect or close the brake pipe-train air line cut-off valve 120 and uncouple the locomotive(s) from the rest of the train.

If the pressure in the train air line had not stabilized prior to the engineman cutting off the engine from the rest of the train, an undesired release of the brakes on the cars may be caused by an abrupt change in the air flow from the train air line. In addition, if there is an obstruction in the line, preventing proper venting of brake pipe/air line pressure, the brakes of some or all of the cars of the train may actually be released! Again, the enginemen's reliance upon what he hears as a control criterion for the operation of a freight train is far from a reasonably safe railway operation procedure.

SUMMARY OF THE INVENTION

In accordance with the present invention, the above described shortcomings of conventional brake control systems are obviated by a new and improved adaptive brake control system that monitors a plurality of brake pipe/air line parameters, such as fluid path volume and air flow rate, in addition to conditions that are normally indicated as gauge readings to the engineman, and controllably modifies action taken by the engineman or performs emergency control of the brakes, in order to continuously enable the braking system to adapt itself to dynamic operating conditions and anomalies in the integrity of the fluid path.

Specifically, pursuant to a first aspect of the present invention, there is provided a control mechanism for precisely controlling the application of a pressure change (reduction) to the equalizing reservoir, and thereby the pressure in the brake pipe/train air line fluid path through which brake control mechanisms of the cars of the train are controlled, in response to a request by the engineman for a reduction in the pressure in the equalizing reservoir (to initiate a braking application) and taking into account the actual state of the brake pipe, so as to ensure that the requested brake application is effected as intended.

To this end, the control mechanism, which is preferably implemented by way of a dedicated microprocessor and attendant signal interface components, in addition to being coupled to monitor the engineman's requested pressure reduction, monitors the brake pipe to determine whether it is currently undergoing a change in air pressure (as would be the case during a recharge of the brake pipe subsequent to the release of a previous brake application). As the pressure within the equalizing reservoir drops in response to the engineman's pressure reduction, the charging rate of the air flowing into the brake pipe through the relay valve will decrease as the dropping pressure within the equalizing reservoir and the slowly rising pressure within the brake pipe approach each other. When the flow rate into the brake pipe becomes negligible (effectively equal to zero), which indicates that brake pipe pressure is now the same as that within the equalizing reservoir, the value of the pressure within the equalizing reservoir at that time is stored. Using this stored value, the requested equalizing reservoir pressure change is modified (increased) by a differential amount equal to the difference between the maximum pressure of the equalizing reservoir and the stored equalizing reservoir pressure value. As a consequence, the pressure in the brake pipe/train air line is accurately reduced by an amount that effectively achieves the engineman's requested pressure reduction.

Similarly, if the requested equalizing reservoir pressure reduction is less than the brake pipe pressure (so that the brake pipe continues to draw charging air), the control mechanism imparts an additional pressure reduction to the equalizing reservoir, so that the air flow into the brake pipe will be forced to drop to zero. Then, when the air flow goes to zero, the value of the pressure within the equalizing reservoir is stored. Again, using the stored value, the requested equalizing reservoir pressure change is modified (increased) by a differential amount equal to the difference between the maximum pressure of the equalizing reservoir and the stored equalizing reservoir pressure value. As a consequence, the pressure in the brake pipe/train air line is accurately reduced by an amount that effectively achieves the engineman's requested pressure reduction.

Pursuant to a second aspect of the invention, the processor-based control mechanism monitors the integrity of the fluid flow path of the brake pipe/train air line, so that the engineman may be alerted and a prescribed train safety measure may be effected in the event of a potentially hazardous anomaly in the link (e.g. inadvertent angle cock closure). For this purpose, whenever the train is newly configured, thereby defining a new length of brake pipe and train air line, the volume of the newly defined fluid flow path through the brake pipe and the train air line is calculated and its value stored as a reference. Based upon continuously monitored brake system parameter data, the volume of the fluid flow path is repeatedly checked. Should an anomaly occur in the physical configuration of the system (for example, an accidental closure of a valve) which changes the measured volume of the fluid flow path (e.g. the locomotive now sees a shorter brake pipe-/air line) and, if undetected, may prevent the train's braking system from operating effectively, action is taken to cause a prescribed reduction in pressure to be applied to the equalizing reservoir, so that the pressure in the fluid flow path is reduced by an amount sufficient to brake the train to a stop.

Pursuant to a third feature of the present invention, the control mechanism is capable of providing the engineman with a precise indication that the brakes of the train have been full released in accordance with a brake release action (initiated, for example, prior to the application of a locomotive tractive force). For this purpose, as in the brake pipe integrity checking scheme, described above, whenever a brake application or release action is initiated, the volume of the fluid flow path through the brake pipe and the train air flow line is measured on a subsequent release. Based upon this measured volume, which is indicative of the length of the fluid path, a 'brakes released' signal is generated after the lapse of a period of time subsequent to the initiation of the brake release action, the period of time corresponding to that period of time required to release all brakes on this train and being determined in accordance with the measured volume of the fluid flow path. Until the 'brakes released' signal is generated, an inhibit signal prevents the application of a tractive force to the locomotive.

Pursuant to a fourth aspect of the present invention, similar to the above described third feature, the control mechanism is capable of providing the engineman with a precise indication that the fluid path has been properly discharged in response to a full service brake application request, (initiated, for example prior to separating the locomotive from the remainder of the train). Again, in response to the engineman's requested action (here, an application of a full service brake reduction of the pressure in the equalizing reservoir through which fluid pressure in the brake pipe/train fluid line is effectively exhausted through the brake pipe control valve), the volume of the fluid flow path through the brake pipe and the train air flow line is measured. As the brake pipe is vented through the relay valve exhaust port, brake pipe pressure, temperature and exhaust flow rate are monitored. If the measured volume matches that of the train when most recently configured, then when the pressure and exhaust flow rate drop to low and stable values, indicating that the brake pipe/train air line is effectively depressurized, an output signal is generated indicating that the brakes of the cars of said train are effectively fully applied and that it is thereby safe to disconnect the locomotive. Until, this output signal is generated, the application of motive power to the locomotive is inhibited.

DETAILED DESCRIPTION

Figure 1:
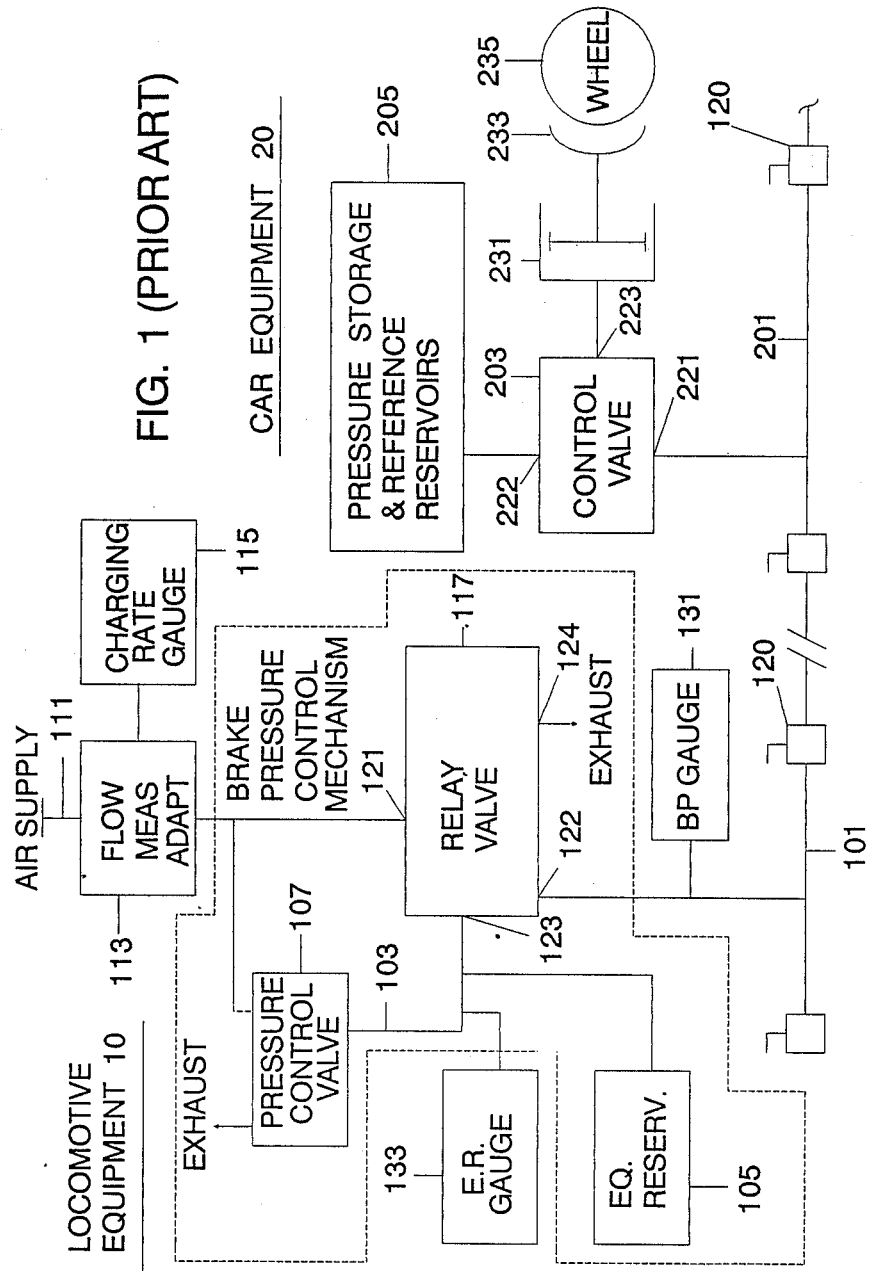
FIG. 1 diagrammatically illustrates a typical air brake system employed by a railway freight train, the application and release of braking action is generally controlled by the engineman within the locomotive.

Before describing in detail the particular improved adaptive air brake control system in accordance with the present invention, it should be observed that the present invention resides primarily in a novel structural combination of conventional brake pipe parameter sensing circuits and signal processing components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
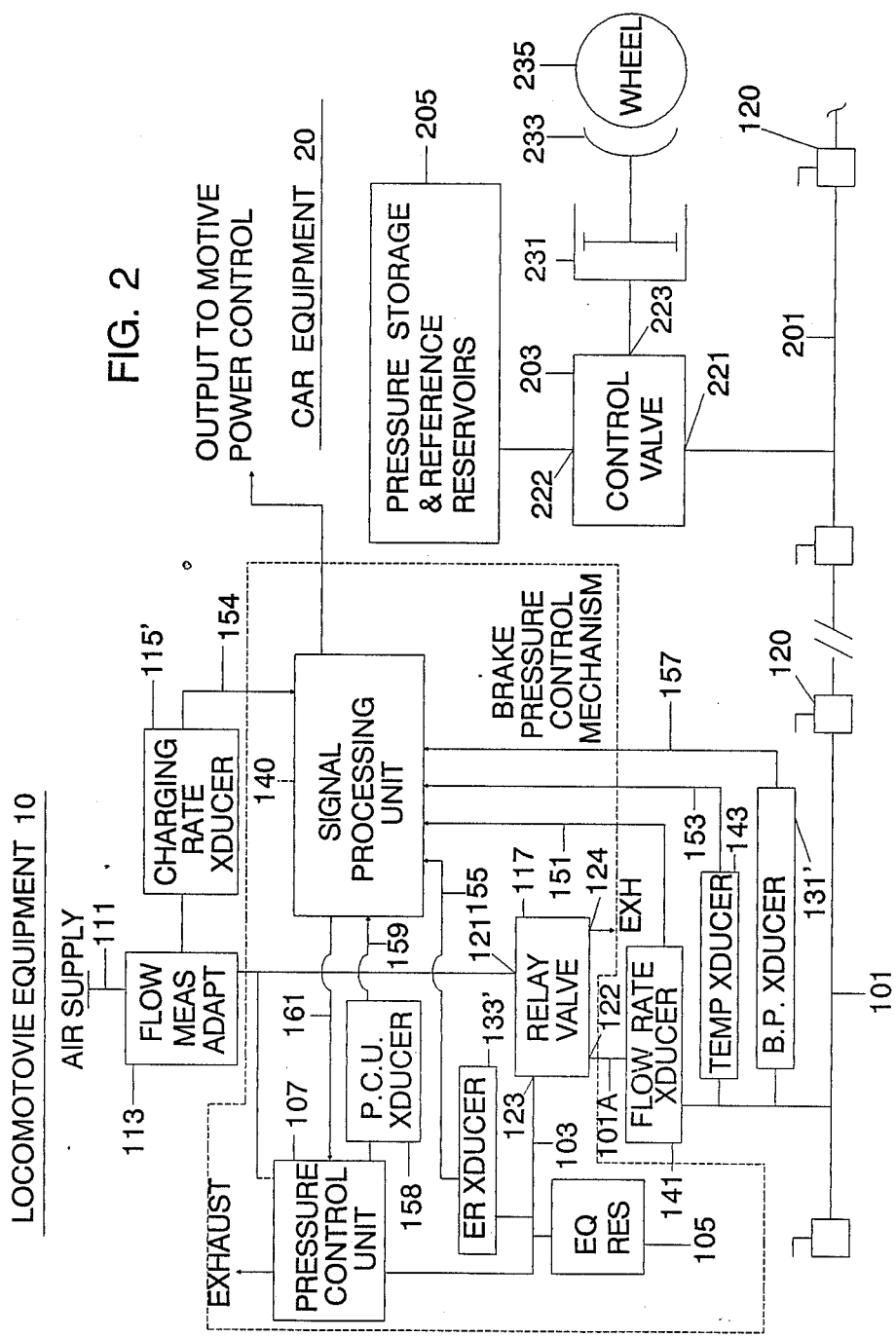
FIG. 2 shows a modification of the air brake control system of FIG. 1 to incorporate the control mechanism of the present invention.

Referring now to FIG. 2, there is shown a modification of the air brake control system described above with reference to FIG. 1, which incorporates the adaptive brake control mechanism according to the present invention which monitors a plurality of brake pipe/air line parameters, such as temperature and air flow rate, in addition to conditions that are normally indicated as gauge readings to the engineman, and controllably modifies action taken by the engineman or performs emergency control of the brakes, in order to continuously enable the braking system to adapt itself to dynamic operating conditions and anomalies in the integrity of the fluid path. For purpose of simplifying the illustration and description of the invention, FIG. 2 effectively replicates FIG. 1 and further shows the manner in which the conventional brake control system is modified to provide the added adaptive control features. For purposes of enabling a brake system control signal processing unit to monitor brake system parameters the gauges shown in FIG. 1 are replaced by corresponding (primed) sensing transducers in FIG. 2.

Referring now to FIG. 2 there is shown the addition of a bi-directional air flow transducer 141 and an air flow temperature transducer 143 coupled in a brake pipe coupling section 101A between bidirectional port 122 of relay valve 117 and brake pipe 101. Bi-directional air flow transducer 141 measures the flow of air (in either direction) between port 122 of relay valve 117 and the brake pipe 101 (and train air line 201 connected thereto) and produces an output signal representative of measured air flow rate. The output of air flow transducer 141 is coupled over a link 151 to a brake pipe parameter signal processing unit 140. Similarly, temperature sensor 143 monitors the temperature of the brake pipe air and couples a signal representative thereof over link 153 to signal processing unit 140. Signal processing unit 140 may be a conventional computer-control unit including microprocessor, memory and signal interface circuitry, as described, for example, in U.S. Patent No. 4,553,723. Additional inputs to signal processing 140 are the pressure of equalizing reservoir 105 as supplied by a signal from equalizing reservoir transducer 133' over link 155, the brake pipe pressure as monitored by brake pipe transducer 131', supplied over link 157 and the pressure via transducer 158 coupled in line 159 at the output of pressure control unit 107, corresponding to the value of an equalizing reservoir pressure requested by the engineman. Signal processing unit 140 is also coupled to receive additional inputs, as by way of an attendant keyboard, representative of additional operational parameters, as will be described below.

Signal processing unit 140 monitors brake pipe/train air line fluid pressure/flow parameters supplied by the outputs of the respective transducers described above, and produces control signals for application to a display and various train motion control devices (such as an equalizing reservoir pressure reduction modification signal over link 161 to pressure control device 107, for controllably modifying a pressure reduction initiated by the engineman) for ensuring safe operation of the train for a number of brake application/release conditions, including those initiated by the engineman, as will be described below.

Adaptive Braking

As pointed out previously, a potentially dangerous condition in the operation of the train occurs when the engineman asserts a braking effort (by operation of pressure control unit 107) subsequent to a preceding braking effort and release, but prior to the complete recharging and stabilization of the braking pressure within the brake pipe/air line system. Briefly readdressing the problem, when the engineman initiates a release of the brakes of the train after a previous braking application, air for charging the brake system is input through the air supply link 111 and relay valve 117, so as to recharge the brake pipe 101 and the train air line 201. During this charging interval, the pressure within the brake pipe 101 rises at a rate that is considerably slower than the rapid rate at which equalizing reservoir 105 is charged. When the pressure within brake pipe 101 equals the pressure of link 103, relay valve 117 interrupts the connection of the air supply link 111 to the brake pipe 101, as the train air line 201 is now fully charged.

If, prior to the brake pipe 101 and train air line 201 becoming fully charged, the engineman operates pressure control unit 107 to reduce the pressure in equalizing reservoir 105 and initiate a new brake application, the pressure differential between the partially charged train air line 201 and pressure storage reservoirs 205 in each of cars 20 will be different than the pressure differential intended by the pressure reduction newly applied to equalizing reservoir 105. As a consequence, each of control valves 203 will sense a smaller pressure differential between ports 221 and 222 than the drop applied to equalizing reservoir 105, so that the braking effort imparted to brake cylinders 231 in each of cars 20 will be less than what the engineman has requested. If not immediately recognized by the engineman, this "reduced-effort" braking application can create a potentially unsafe condition of the train.

In accordance with the control mechanism of the present invention, the application of a pressure change (reduction) to the equalizing reservoir is controllably augmented by an amount that corrects for a charge shortage in the brake pipe at the time of the new brake application, so as to ensure that the requested brake application is effected as intended. For this purpose, the control mechanism monitors the brake pipe pressure and charging rate to determine whether it is currently undergoing a change in air pressure (as would be the case during a recharge of the brake pipe subsequent to the release of a previous brake application). As the pressure within the equalizing reservoir drops in response to the engineman's pressure reduction, the charging rate of the air flowing into the brake pipe through the relay valve will decrease as the dropping pressure within the equalizing reservoir and the slowly rising pressure within the brake pipe approach each other. When the flow rate into the brake pipe become negligible (effectively equal to zero), which indicates that equalizing reservoir pressure is now the same as that within the brake pipe, the value of the pressure within the equalizing reservoir at that time is stored. Using this stored value, the equalizing reservoir pressure change requested by the engineman, by the operation of pressure control valve 107, is modified by a differential amount equal to the difference between the maximum charging pressure of the equalizing reservoir and the stored equalizing reservoir pressure value. As a consequence, the pressure in the brake pipe/train air line is accurately reduced by an amount that effectively achieves the engineman's requested reduction.

Figure 3:
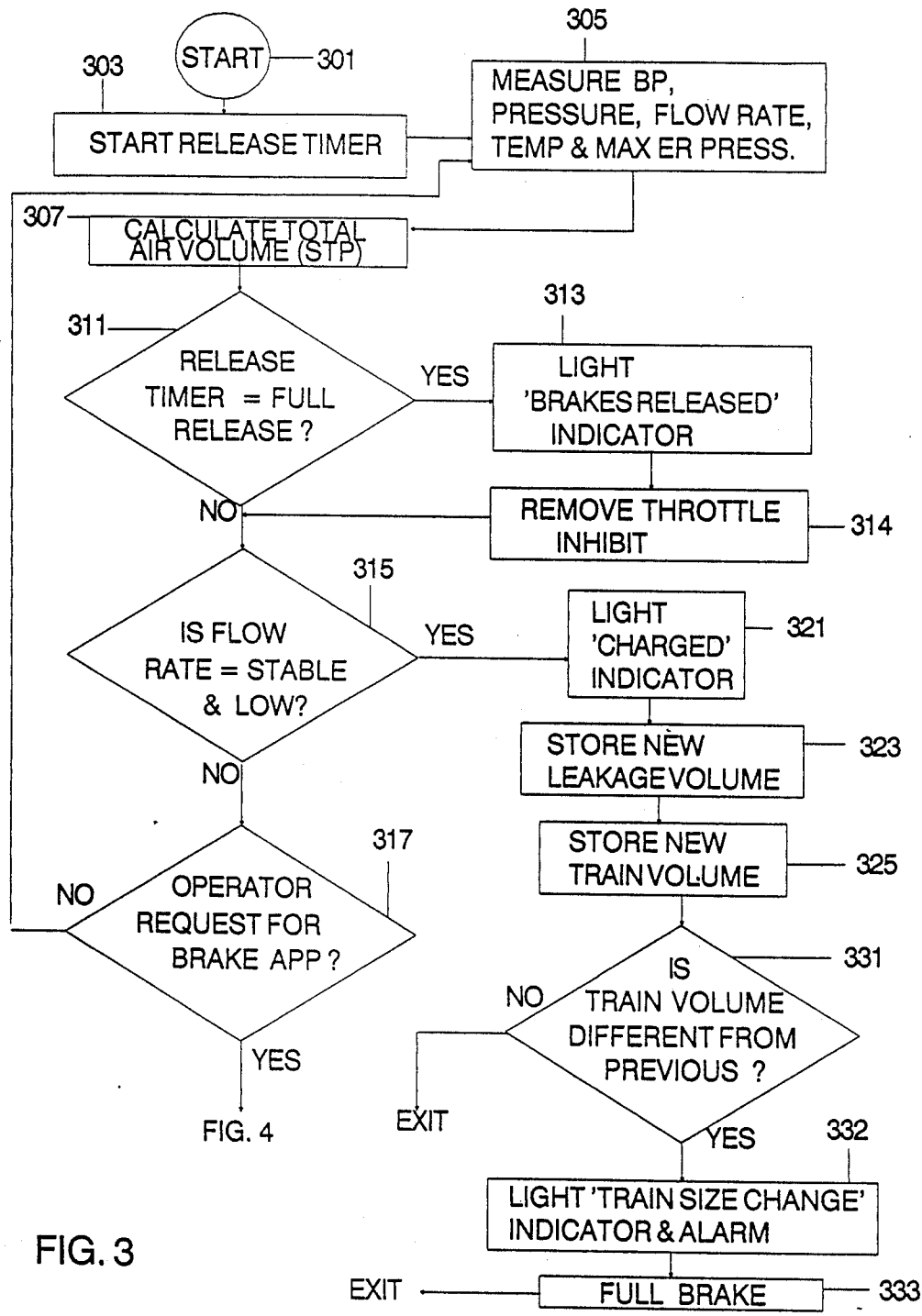
FIGS. 3-7 are flow charts of the control mechanism employed in the brake control system of FIG. 2.
Figure 4:
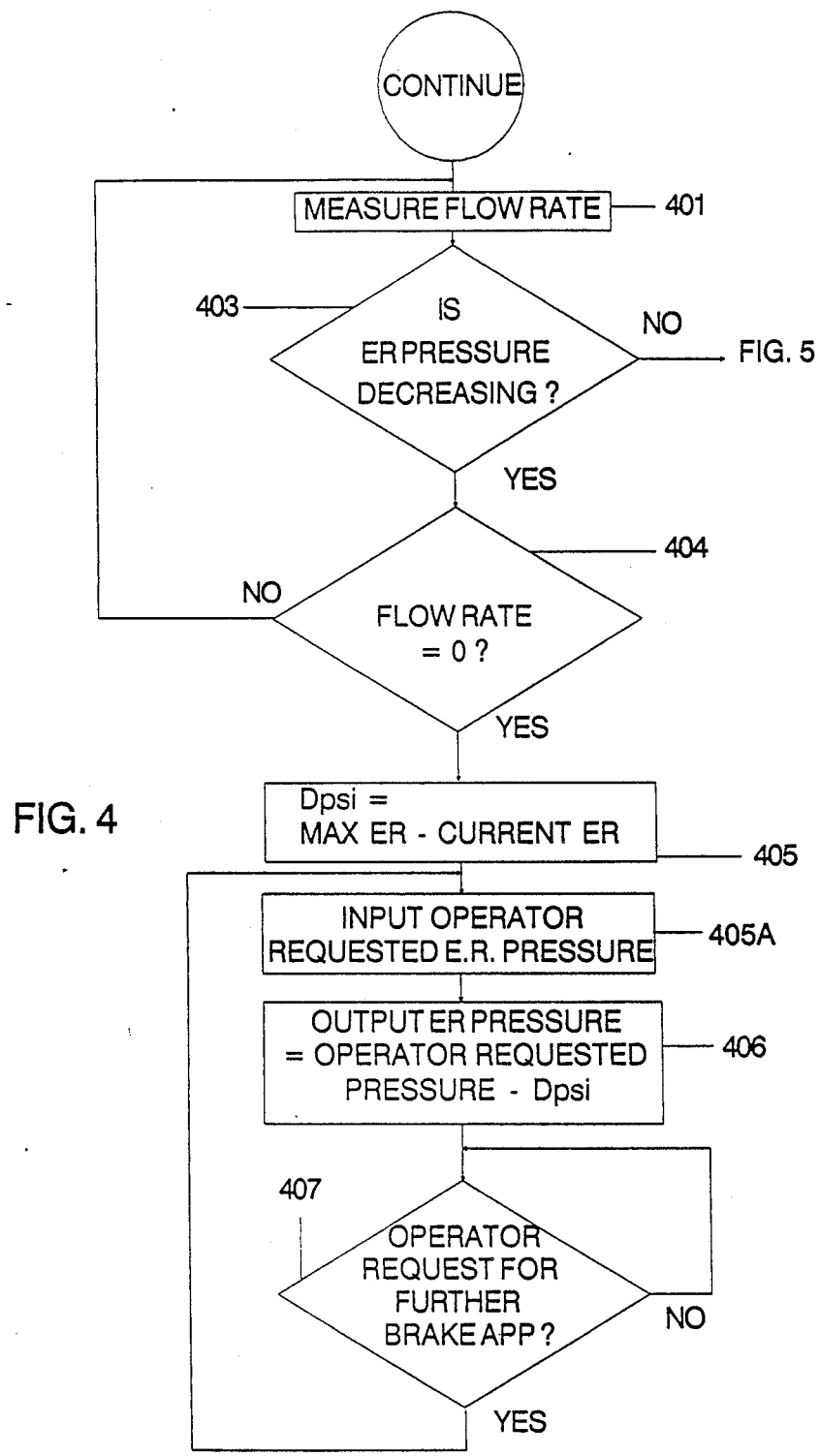
Figure 5:
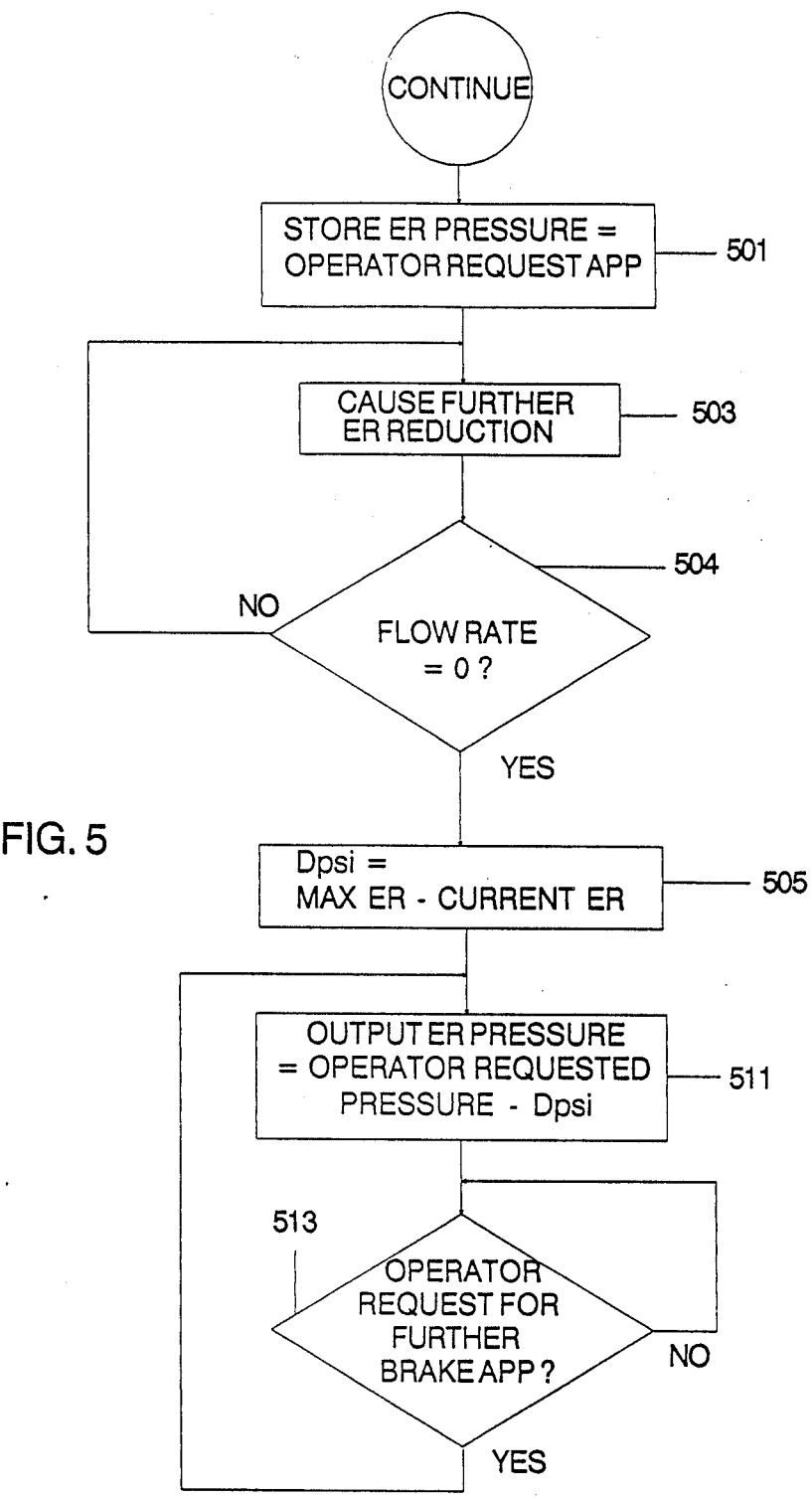

The sequence of steps that are executed by signal processor 40 to implement this control mechanism are set forth in the processing flow diagram of FIGS. 3-5. Let it be initially assumed that the train, of some defined length, is currently subjected to a brake application. At this point the engineman starts the process by initiating a brake release <START> step 301, by operating pressure control device 107, to cause equalizing reservoir 105 to be charged up, thereby advising signal processing unit 140 that a recharge has been requested. Ignoring for the present the <START RELEASE TIMER> step 303 and <RELEASE TIMER=FULL RELEASE?> step 311, to be described below, the process proceeds to step 305 <MEASURE BRAKE PIPE TEMPERATURE, PRESSURE & FLOW RATE>, wherein signal processing unit 140 measures brake pipe pressure, temperature and flow rate. By monitoring these variables, signal processing unit 140 calculates, in step 307 <CALCULATE TOTAL AIR VOLUME> the total quantity or volume of air that is pumped into the system through the air supply link 111 and relay valve 117, during the charge of the brake pipe 101 and air line 201. Air line volume is calculated by signal processing unit 140 on the basis of measured flow rate, temperature and pressure of the air within the fluid flow path using standard gas law equations.

A stabilized and fully charged condition, a yes condition of <FLOW RATE LOW & STABLE> step 315, occurs when the charging air flow rate becomes negligible or is constant and below a prescribed threshold (for example, a flow rate on the order of five cfm). Until the brake pipe becomes fully charged, however, the process proceeds to step 317 <OPERATOR REQUEST FOR BRAKE APPLICATION?>, where an inquiry is made as to whether the engineman has made a new brake application, namely whether the requested equalizing reservoir pressure reduction requires modification to bring the brake pipe pressure down to a level that will cause the braking mechanisms in each of cars 20 to impart the intended braking force. Assuming that there is still a significant air flow through the brake pipe link 101 (as monitored by transducer 141, step 315) and the engineman has initiated a brake pipe application (step 317), the process proceeds to step 401 <MEASURE FLOW RATE> in FIG. 4.

Next, in step 403 <ER PRESSURE DECREASING?>, the output of equalizing reservoir pressure transducer 133' is monitored to determine whether the equalizing reservoir pressure is decreasing or has reached the pressure requested by the engineman. If the equalizing pressure is not decreasing, the process proceeds to FIG. 5, step 501 <DIGITIZE & STORE EQUALIZING RESERVOIR PRESSURE>, at which time the equalizing reservoir pressure is stored. For purposes of the present description, however, given the operating condition in which the engineman has requested a further brake pipe reduction, then the pressure within equalizing reservoir 105 will still be decreasing, so that the process proceeds to step 404 <FLOW RATE=0?>. Until the flow rate drops to the above-referenced negligible value, the process loops back to step 401. Eventually, however, as the pressure within brake pipe 101 continues to slowly rise and the pressure in the equalizing reservoir continues to drop, the flow rate will become smaller and smaller and reach a value (as measured by flow transducer 141) that causes the process to proceed to step 405 <Dpsi MAX ER-CURRENT ER>, in which a differential pressure value Dpsi, equal to the maximum (fully charged) equalizing reservoir pressure minus the output of equalizing pressure transducer 133' measured at the time at which the brake pipe flow rate effectively drops to zero (brake pipe pressure matches that of the equalizing reservoir), is stored.

Next, in step 406 <OUTPUT E. R. PRESSURE=OPERATOR REQUESTED PRESSURE-Dpsi), signal processing unit 140 controls pressure control unit 107 and equalizing reservoir 105 to modify (further reduce) the requested pressure by the value determined in step 405. Also, for any further brake application (prior to release), as indicated by step 407, signal processing unit 140 again modifies the requested pressure reduction by the value determined in step 405. In either event, the modification of the requested equalizing reservoir pressure will ensure that the pressure in the brake pipe 101 is at the correct value to cause the control valves 203 in the cars 20 of the train to effectively track requested brake pipe reduction.

As pointed out above, if the brake application requested by the engineman causes the pressure in the equalizing reservoir to be higher than the brake pipe pressure (NO to step 403), the process proceeds to step 501, FIG. 5, where the value of the current equalizing reservoir pressure is stored. Next, in step 503, <CAUSE FURTHER ER REDUCTION>, the equalizing reservoir pressure is reduced and then, in step 504, <FLOW RATE=0?>, it is determined whether the air flow rate as monitored by flow rate transducer 141 has dropped to zero. Until the flow rate drops to zero, the process is looped back to step 503 resulting in a falling equalizing reservoir pressure. Upon the brake pipe air flow rate reaching zero, indicating that the brake pipe pressure matches that of the equalizing reservoir, the process proceeds to steps 505, 511 and 513, which effects a subtraction of the sensed pressure differential Dpsi from the requested pressure similar to that which takes place in steps 405, 406, 407, described above with reference to FIG. 4.

As noted above, in addition to potential safety hazards that may result from action the engineman may take (e.g. initiating a brake application prior to charging pressure stabilization of the brake pipe/train air line), the control mechanism of the present invention continuously monitors the integrity of the train air line and takes corrective action in the event of the occurrence of an anomaly. For example, in the event of an obstruction or blockage of the brake pipe/air line, resulting in a change in the effective volume of the brake pipe/air line, a warning indication is given to the engineman by way of his control stand and a signal is generated which inhibits movement of the train until the obstruction is located and cleared.

One possible cause of a change in the volume of the air line is an improper setting of one of the cut-out valves 120 in the brake pipe/train air line. If this improper setting remains undetected, it is possible that the train may proceed with brakes controlled on part of the train but disabled on the remainder of the train. To prevent this from occurring, the control mechanism of the present invention employs the sequence of steps shown in FIG. 6 (for brake application) and similarly in FIG. 3 (for brake release). In response to the engineman initiating a brake application, in step 601 <MEASURE BP PRESSURE, FLOW RATE & TEMP>, air pressure, temperature and flow rate from the brake pipe/air line are measured. Next, in step 603 <CALCULATE AIR VOLUME>, the volume of the brake line is calculated. In steps 605 and 607 the presently calculated volume of the brake line is compared with a previously determined (known) value. If the newly calculated brake pipe volume is the same as that of the reference, the program is exited. However, if the currently calculated volume is different from its expected value, the process proceeds to step 611 <INDICATE TRAIN SIZE CHANGE>, and step 613 <SAVE NEW VOLUME>. As a consequence, a train size change indication is signalled via the engineman's control stand (step 611), the new volume is stored (step 613) and a full brake application is initiated (step 615). This full brake application is effected in order to bring the train to a complete stop, so that the integrity of the brake line can be checked and the problem corrected.

Figure 7:
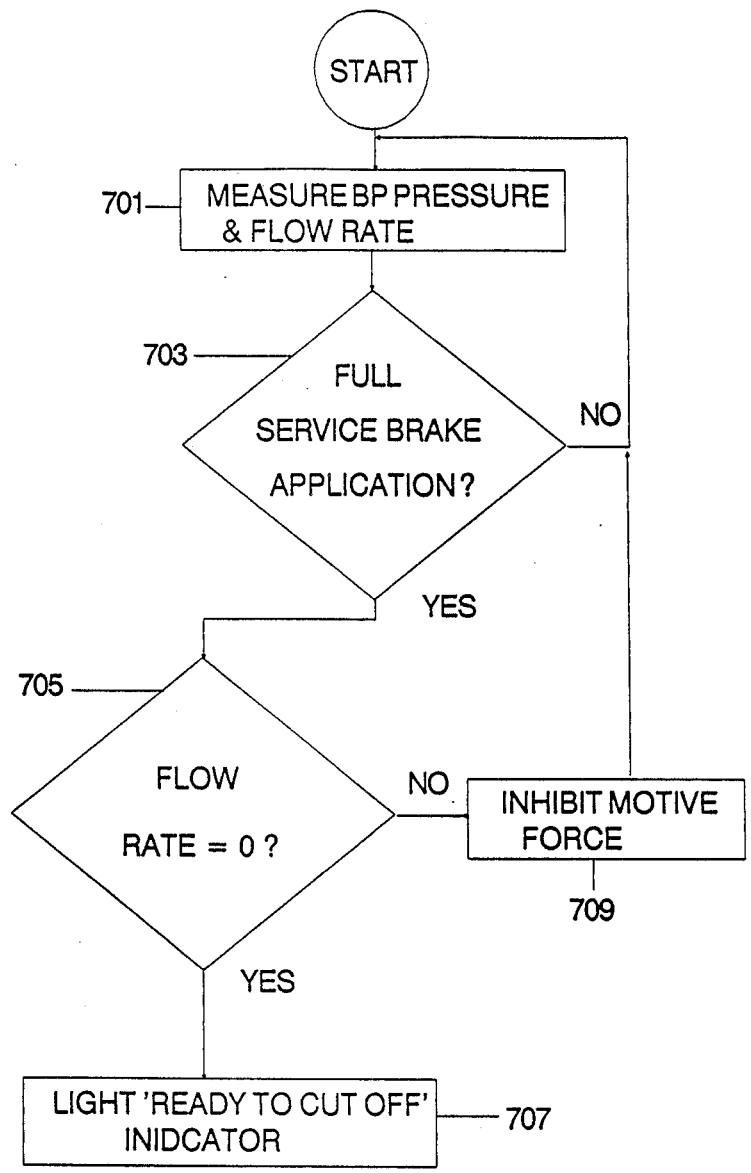

In conjunction with the brake line integrity check capability, it is important that the engineman know when it is safe to disconnect the engine(s) from the remainder of the train, as, for example, at a destination or switching yard. Normal procedure requires the engineman to initiate a full service brake application on the train in preparing for disconnect. The engineman then waits until the brake application (full service brake application) propagates through the brake pipe/air line and the air exhaust valve at the locomotive relay valve 117 is no longer venting air. He then proceeds to close the brake pipe/train air line cut-off valve 120 and disconnect the locomotive from the cars. As pointed out previously, a critical requirement of this process is that the air pressure within the train line be stabilized; if it is not, the abrupt change in flow rate may result in a release of the brakes of the car of the train. Rather than have the engineman rely upon what he hears, a very imprecise procedure, the control mechanism of the present invention employs the process shown in FIG. 7.

Figure 6:
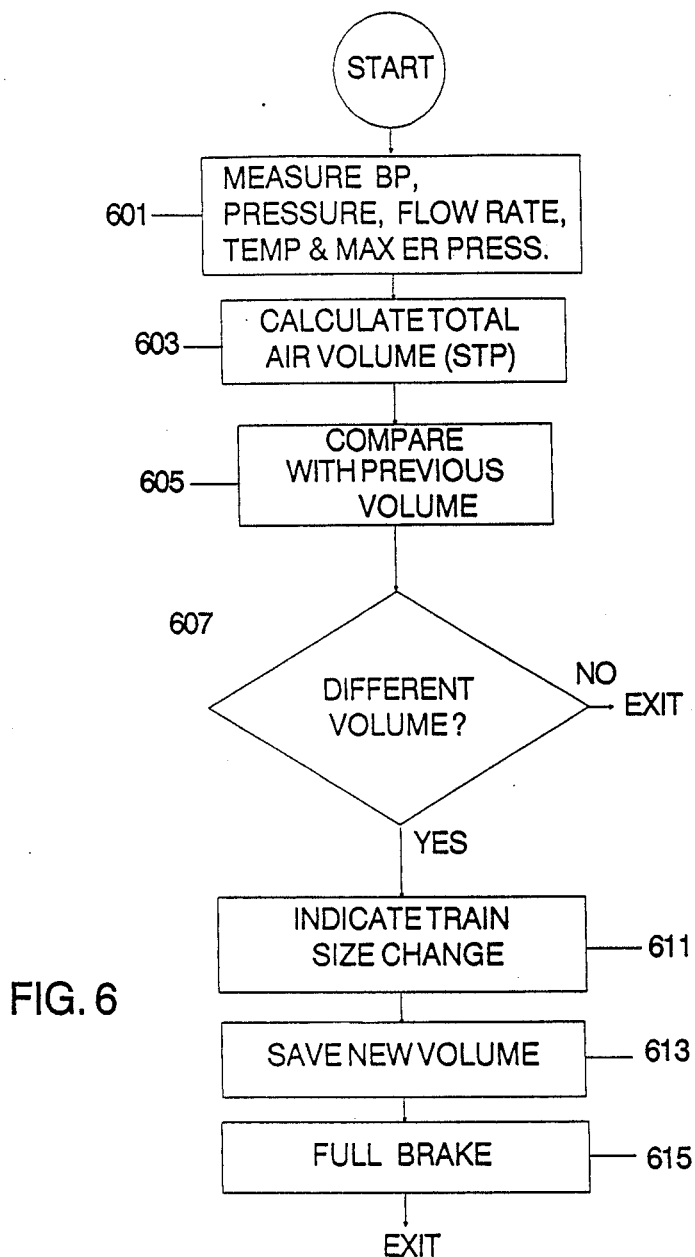

As in the flow diagram of FIG. 6 at step 701 <MEASURE BP PRESSURE, TEMPERATURE & FLOW RATE>, signal processing unit 140 measures brake pipe parameters and then inquires, in step 703 <FULL SERVICE BP REDUCTION?> whether the engineman has requested a full service brake application (for maximum non-emergency braking effort). Assuming a full service brake application, the process proceeds to step 705 <FLOW RATE=0 ?> and monitors the output of flow rate sensor 141 to determine when air flow has stopped (effectively zero flow rate), thus indicating that the exhaust flow from port 124 of relay valve 117 has stopped. Once the brake pipe 101 and train line 201 have been stabilized (step 705, YES), the process proceeds to step 707 <LIGHT READY FOR CUT-OFF INDICATOR> to cause a display on the control stand to provide an indication to the enginemen that it is safe to disconnect the locomotive from the cars of the train. Until the brake line has stabilized, the negative answer to step 705 proceeds to step 709 <INHIBIT TRACTION FORCE> to cause a locomotive traction force inhibit signal to be applied to the drive control system of the locomotive so that no part of the train can be moved until the full service brake application is completed.

An additional aspect of the control mechanism of the present invention is to provide the engineman with a precise indication that the brakes of the train have been fully released in accordance with a brake release action (initiated, for example prior to the application of a locomotive tractive force). For this purpose, as in the brake pipe integrity checking scheme, described above, whenever a brake application or release action is initiated, the volume of the fluid flow path through the brake pipe and the train air flow line is measured. Based upon this measured volume, which is indicative of the length of the fluid path, a 'brakes released' signal is generated after the lapse of a period of time subsequent to the initiation of the brake release action, the period of time being determined in accordance with the measured volume of the fluid flow path. Until the 'brakes released' signal is generated, an inhibit signal prevents the application of a tractive force to the locomotive.

This timeout operation is effected in accordance with the sequence of steps within the flow diagram of FIG. 3, reference above in connection with the description of the pressure reduction modification. In response to the initiation of a pressure increase request, a softtimer within signal processing unit 140 is started, (<START RELEASE TIMER>, step 303). Subsequently, at step 311, using the volume calculation executed in a previous execution of step 307 <RELEASE TIMER=FULL RELEASE?>, the process inquires whether, the softtimer has counted to a value that corresponds to the length of time required for the pressure increase to have propagated completely down the brake pipe and train air line. If not, the process proceeds to step 315, described supra. If the answer to step 311 is YES, the process proceeds to <BRAKES RELEASED INDICATION> step 313, so that the display on the locomotive control stand will advise the engineman that the brakes are now fully released. Then, in step 314 <REMOVE DRIVE INHIBIT>, a tractive force inhibit signal is removed form the locomotive drive system, so that the train can be driven.

As a further feature of the brake pipe pressure monitoring and pressure reduction modification mechanism that is executed in response to the initiation of a brake release operation, (FIG. 3) the present invention provides a scheme for precisely indicating when the brake pipe has been completely recharged. For this purpose, as shown in FIG. 3, upon the flow rate of sensor 141 reaching what is effectively a zero flow rate (as a result of the pressure within brake line 101 coming up to maximum charge), as indicated by a YES answer to step 315, steps 321, 323 and 325 are executed to provide an indication to the engineman that the brake pipe is fully charged. In addition, with the brake pipe now fully charged, any leakage (e.g. as through coupling joints and fittings) can be accurately determined from the output of flow sensor 141, so that brake pipe volume can be accurately determined (taking the leakage value into account). With these new values stored, the volume is compared with that previously calculated in step 331 <TRAIN VOLUME DIFFERENT FROM PREVIOUS?>. If the volume is unchanged, the program is exited. If the processor calculates a different volume value, then it is inferred that there is an anomaly in the brake line which requires attention. Consequently, in addition to energizing a display in step 332 <LIGHT TRAIN SIZE CHANGE INDICATOR & ALARM>, a dynamic braking (of the locomotive power train) and a full braking pressure reduction is asserted in step 333.

As will be appreciated from the foregoing description, the present invention enhances the ability of a train control system to successfully apply braking and safely control the train by means of an adaptive control mechanism that monitors a plurality of brake pipe/air line parameters, such as fluid path volume and air flow rate, in addition to conditions that are normally indicated as gauge readings to the engineman, and controllably modifies action taken by the engineman or performs emergency control of the brakes, in order to continuously enable the braking system to adapt itself to dynamic operating conditions and anomalies in the integrity of the fluid path.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with the brake system of a railway train having a locomotive which contains an equalizing reservoir and a brake pipe coupled in fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe control valve, in accordance with the control of the fluid pressure within said equalizing reservoir, a method of controlling the pressure in said equalizing reservoir, and thereby the pressure in said fluid line through which said brake control mechanism is controlled, in response to a request for a reduction in the pressure in said equalizing reservoir, comprising the steps of:
   (a) monitoring the change in pressure in said brake pipe in response to a request for application of the train's brakes;
   (b) in response to the pressure within said brake pipe reaching a preselected condition, storing the value of the pressure within said equalizing reservoir; and
   (c) causing the pressure in said equalizing reservoir to be changed to an amount corresponding to said requested reduction modified by the difference between a preestablished equalizing reservoir pressure and said stored equalizing reservoir pressure, whereby the pressure in said fluid line is caused to be reduced by an amount corresponding to said requested reduction.

2. A method according to claim 1, wherein step (a) comprises monitoring the flow rate of braking control fluid flowing into said brake pipe, and step (b) comprises storing the value of the pressure within said equalizing reservoir upon said flow rate being reduced to a preselected value.

3. A method according to claim 1, wherein said preestablished equalizing reservoir pressure corresponds to the maximum pressure at which said equalizing reservoir is charged.

4. A method according to claim 1, wherein step (c) comprises causing the pressure in said equalizing reservoir to be changed to an amount corresponding to the sum of said requested reduction and the difference between the maximum pressure at which said equalizing reservoir pressure is charged and said stored equalizing reservoir pressure.

5. For use with the brake system of a railway train having a locomotive which contains an equalizing reservoir and a brake pipe coupled in fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe control valve, in accordance with the control of the fluid pressure within said equalizing reservoir, a method of controlling the pressure in said equalizing reservoir, and thereby the pressure in said fluid line through which said brake control mechanism is controlled, in response to a request for a reduction in the pressure in said equalizing reservoir, comprising the steps of:
   (a) monitoring the change in pressure in said brake pipe in response to a request for an application of the train's brakes;
   (b) in response to the pressure within said brake pipe not reaching a preselected condition, causing a further reduction in the pressure in said equalizing reservoir;
   (c) in response to the pressure within said brake pipe reaching a preselected condition as a result of the execution of step (b), storing the value of the pressure within said equalizing reservoir; and
   (d) causing the pressure in said equalizing reservoir to be further changed to an amount corresponding to said requested reduction modified by the difference between a preestablished equalizing reservoir pressure and said stored equalizing reservoir pressure, whereby the pressure in said fluid line is caused to be reduced by an amount corresponding to said requested reduction.

6. A method according to claim 5, wherein step (d) comprises causing the pressure in said equalizing reservoir to be changed to an amount corresponding to the sum of said requested reduction and the difference between the maximum pressure at which said equalizing reservoir is charged and said stored equalizing reservoir pressure.

7. A method according to claim 6, wherein step (a) comprises monitoring the flow rate of braking control fluid flowing into said brake pipe, and step (c) comprises storing the value of the pressure within said equalizing reservoir upon said flow rate being reduced to a preselected value.

8. For use with the brake system of a railway train having a locomotive which contains an equalizing reservoir and a brake pipe coupled in fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe control valve, in accordance with the control of the fluid pressure within said equalizing reservoir, a method of monitoring the integrity of the brake system, so that a prescribed train safety measure may be effected in the event of a potentially hazardous change therein, comprising the steps of:
  (a) storing first information representative of the volume of the fluid flow path through said brake pipe an said train fluid line;
  (b) in response to a change in the volume of said fluid flow path, causing a prescribed reduction in pressure to be applied to said equalizing reservoir, whereby the pressure in said fluid flow path is caused to be reduced by an amount sufficient to effect a full brake application to said train, said step (b) including the steps of
  (b1) repeatedly measuring the volume of said fluid flow line;
  (b2) monitoring said brake pipe for the presence of a change in braking control fluid pressure therein; and
  (b3) in response to the charging rate into said brake pipe being constant and less than a preselected value and in response to a change in the volume of said fluid flow line, causing the pressure in said equalizing reservoir to be reduced by an amount sufficient to effect a full brake application to said train.

9. For use with the brake system of a railway train having a locomotive which contains an equalizing reservoir and a brake pipe coupled in fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe control valve, in accordance with the control of the fluid pressure within said equalizing reservoir, a method of providing an indication to train operation personnel that the brakes of the train have been fully released in accordance with a brake release action, comprising the steps of:
  (a) measuring the volume of a fluid flow path through said brake pipe and said train fluid flow line; and
  (b) in response to the initiation of a brake release action, generating a 'brakes released' signal after the lapse of a period of time subsequent to the initiation of said brake release action, said period of time being determined at least in part by the volume of said fluid flow path as measured in step (a).

10. For use with the brake system of a railway train having a locomotive which contains an equalizing reservoir and a brake pipe coupled in fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through s id brake pipe control valve, in accordance with the control of the fluid pressure within said equalizing reservoir, a method of providing an indication to train operation personnel that the brakes on all of the operating train cars have been effectively applied in accordance with a brake application request, in response to which fluid pressure in said fluid line is effectively exhausted to the required air line pressure through said brake pipe control valve, whereby the brake mechanism of each car is operated to apply braking to the wheels thereof, comprising the steps of:
  (a) monitoring the pressure of the braking control fluid within said brake pipe;
  (b) in response to said brake application request and in response to the pressure within said brake pipe, as monitored in step (a), reaching a predefined value and undergoing a change less than a preselected value, generating an output signal indicating that the brakes on all the operative cars in said train are effectively fully applied and that it is thereby safe to disconnect said locomotive therefrom.

11. A method according to claim 10, wherein step (a) comprises monitoring the pressure of the braking control fluid and the flow rate of braking control fluid flowing into said brake pipe, and step (b) comprises generating said output signal in response to said pressure reaching said predefined value and said flow rate being constant and less than said preselected value.

12. A control apparatus for controlling the operation of a brake system of a railway train having a locomotive which contains an equalizing reservoir and a brake pipe coupled in fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe control valve, in accordance with the control of the fluid pressure within said equalizing reservoir, said control apparatus controlling the pressure in said equalizing reservoir, and thereby the pressure in said fluid line through which said brake control mechanism is controlled, in response to a request for a reduction in the pressure in said equalizing reservoir, and comprising:

brake pipe monitoring means, coupled with said brake pipe, for monitoring a change in pressure in said brake pipe and providing an output signal representative thereof; and control means, coupled to receive the output signal from said brake pipe monitoring means and responsive to the pressure within said brake pipe reaching a preselected condition, for storing the value of the pressure within said equalizing reservoir and causing the pressure in said equalizing reservoir to be changed by an amount corresponding to said requested reduction modified by the difference between a preestablished equalizing reservoir pressure and said stored equalizing reservoir pressure, whereby the pressure in said fluid line is caused to be reduced by an amount corresponding to said requested reduction.

13. A control apparatus according to claim 12, wherein said brake pipe monitoring means comprises means for monitoring the flow rate of braking control fluid flowing into said brake pipe, and wherein said control means comprises means for storing the value of the pressure within said equalizing reservoir upon said flow rate being reduced to a preselected value.

14. A control apparatus according to claim 12, wherein said preestablished equalizing reservoir pressure corresponds to the maximum pressure at which said equalizing reservoir is charged.

15. A control apparatus according to claim 12, wherein said control means comprises means for causing the pressure in said equalizing reservoir to be changed to an amount corresponding to the sum of said requested reduction and the difference between the maximum pressure at which said equalizing reservoir pressure is charged and said stored equalizing reservoir pressure.

16. A control apparatus for controlling the operation of a brake system of a railway train having a locomotive which contains an equalizing reservoir and a brake pipe coupled in fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe control valve, in accordance with the control of the fluid pressure within said equalizing reservoir, said control apparatus controlling the pressure in said equalizing reservoir, and thereby the pressure in said fluid line through which said brake control mechanism is controlled, in response to a request for a reduction in the pressure in said equalizing reservoir, and comprising:

brake pipe monitoring means for monitoring a change in pressure in said brake pipe in response to a request for an application of the train brakes; and control means, coupled to said brake pipe monitoring means and responsive to the pressure within said brake pipe not reaching a preselected condition, for causing a further reduction in the pressure in said equalizing reservoir and, in response to the pressure within said brake pipe reaching a preselected condition as a result of said further pressure reduction, for storing the value of the pressure within said equalizing reservoir and causing the pressure in said equalizing reservoir to be changed to an amount corresponding to said requested reduction modified by the difference between a preestablished equalizing reservoir pressure and said stored equalizing reservoir pressure, whereby the pressure in said fluid line is caused to be reduced by an amount corresponding to said requested reduction.

17. A control apparatus according to claim 16, wherein said control means comprises means for causing the pressure in said equalizing reservoir to be changed to an amount corresponding to the total of said requested reduction and the difference between the maximum pressure at which said equalizing reservoir is charged and said stored equalizing reservoir pressure.

18. A control apparatus according to claim 16, wherein said brake pipe monitoring means comprises means for monitoring the flow rate of braking control fluid flowing into said brake pipe, and said control means comprises means for storing the value of the pressure within said equalizing reservoir upon said flow rate being reduced to a preselected value.

19. A control apparatus for controlling the operation of the brake system of a railway train having a locomotive which contains an equalizing reservoir and brake pipe coupled in a fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe control valve, in accordance with the control of the fluid pressure within said equalizing reservoir, said control apparatus generating an output signal for enabling a motive drive system of said locomotive to apply a tractive force to said locomotive, so that said locomotive may be separated from the cars of said train and providing an indication to train operation personnel that the brakes of the train have been fully applied in accordance with a brake application request, in response to which fluid pressure in said fluid line is effectively exhausted to the required air line pressure through said brake pipe control valve, whereby the brake mechanism of each car is operated to apply braking to the wheels thereof, comprising:

sensor means, coupled with said brake pipe, for monitoring pressure within said brake pipe and producing an output signal representative thereof; and control means, coupled to receive the pressure representative output signal produced by said sensor means, and being responsive to said brake application request and said pressure representative signal indicating that the pressure in said brake pipe has reached a predefined value and is undergoing a change less than a preselected value, for generating a signal indicating that the brakes of the cars of said train are effectively fully applied and that it is thereby safe to disconnect said locomotive therefrom, and for coupling said indicating signal to the drive system of said locomotive for enabling said drive system to apply a tractive force to said locomotive, so that said locomotive may be separated from the cars of said train.

20. An apparatus according to claim 19, wherein said sensor means comprises flow sensor means for monitoring the pressure of the braking control fluid and the flow rate of braking control fluid flowing into said brake pipe, and wherein said control means comprises means for generating said indicating signal in response to said pressure reaching said predefined value and said flow rate undergoing a change less than said preselected value.

21. For use with the brake system of a railway train having a locomotive which contains a brake pipe coupled in fluid communication with a brake pipe pressure control mechanism, said mechanism being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe pressure control mechanism, in accordance with a pressure reference parameter stored therein representing the required brake pipe pressure, a method of controlling the pressure in said fluid line through which said brake control mechanism is controlled, in response to a request for a reduction in the pressure in said brake pipe, comprising the steps of:
(a) monitoring the change in pressure in said brake pipe in response to a request for application of the train's brakes;
(b) in response to the pressure within said brake pipe reaching a preselected condition, storing a pressure value equal to the current value of the pressure reference parameter; and
(c) causing the value of the pressure reference parameter to be changed to an amount corresponding to said requested reduction modified by the difference between a preestablished pressure reference parameter value and said stored pressure value, whereby the pressure in said fluid line is caused to be reduced by an amount corresponding to said requested reduction.

22. A method according to claim 21, wherein step (a) comprises monitoring the flow rate of braking control fluid flowing into said brake pipe, and step (b) comprises storing a pressure value equal to the pressure reference parameter upon said flow rate being reduced to a preselected value.

23. A method according to claim 21, wherein said preestablished pressure reference value corresponds to the maximum value to which the pressure reference parameter is set.

24. A method according to claim 21, wherein step (c) comprises causing the pressure reference parameter to be changed to an amount corresponding to the sum of said requested reduction and the difference between the maximum value to which the pressure reference parameter is set and said stored pressure value.

25. For use with the brake system of a railway train having a locomotive which contains a brake pipe coupled in fluid communication with a brake pipe pressure control mechanism, said mechanism being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe pressure control mechanism, in accordance with a pressure reference parameter stored therein representing the required brake pipe pressure, a method of controlling said pressure reference parameter, and thereby the pressure in said fluid line through which said brake control mechanism is controlled, in response to a request for a reduction in the pressure in said brake pipe, comprising the steps of:
(a) monitoring the change in pressure in said brake pipe in response to a request for an application of the train's brakes;
(b) in response to the pressure within said brake pipe not reaching a preselected condition, causing a further reduction in the said pressure in said pressure reference parameter;
(c) in response to the pressure within said brake pipe reaching a preselected condition as a result of the execution of step (b), storing a pressure reference value equal to the current value of the pressure reference parameter; and
(d) causing the value of the pressure reference parameter to be further changed to an amount corresponding to said requested reduction modified by the difference between a preestablished pressure reference parameter value and said stored pressure reference value, whereby the pressure in said fluid line is caused to be reduced by an amount corresponding to said requested reduction.

26. A method according to claim 25, wherein step (d) comprises causing the value of the pressure reference parameter to be changed to an amount corresponding to the sum of said requested reduction and the difference between the maximum value to which the pressure reference parameter is set and said stored pressure reference value.

27. A method according to claim 26, wherein step (a) comprises monitoring the flow rate of braking control fluid flowing into said brake pipe, and step (c) comprises storing the value of the pressure reference parameter upon said flow rate being reduced to a preselected value.

28. A control apparatus for controlling the operation of a brake system of a railway train having a locomotive which contains a brake pipe coupled in fluid communication with a brake pipe pressure control mechanism, said mechanism being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe pressure control mechanism, in accordance with a pressure reference parameter stored therein representing the required brake pressure, said control apparatus controlling said pressure reference parameter, and thereby the pressure in said fluid line through which said brake control mechanism is controlled, in response to a request for a reduction in the pressure in said brake pipe, and comprising:

brake pipe monitoring means, coupled with said brake pipe, for monitoring a change in pressure in said brake pipe and responsive to an application of the train's brakes, for monitoring the change in pressure in said brake pipe and providing an output signal representative thereof; and control means, coupled to receive the output signal from said brake pipe monitoring means and responsive to the pressure within said brake pipe reaching a preselected condition, for storing a value equal to the current value of the pressure reference parameter and causing the value of the pressure reference parameter to be changed to an amount corresponding to said requested reduction modified by the difference between a preestablished pressure reference parameter value and said stored pressure reference value, whereby the pressure in said fluid line is caused to be reduced by an amount corresponding to said requested reduction.

29. A control apparatus according to claim 28, wherein said brake pipe monitoring means comprises means for monitoring the flow rate of braking control fluid flowing into said brake pipe, and wherein said control means comprises means for storing the value of the pressure reference parameter upon said flow rate being reduced to a preselected value.

30. A control apparatus according to claim 28, wherein said control means comprises means for causing the value of the pressure reference parameter to be changed to an amount corresponding to the sum of said requested reduction and the difference between the maximum value to which the pressure reference parameter is set and said stored pressure reference value.

31. A control apparatus for controlling the operation of a brake system of a railway train having a locomotive which contains a brake pipe coupled in fluid communication with a brake pipe pressure control mechanism, said mechanism being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe pressure control mechanism, in accordance with a pressure reference parameter stored therein representing the required brake pressure, said control apparatus controlling said pressure reference parameter, and thereby the pressure in said fluid line through which said brake control mechanism is controlled, in response to a request for a reduction in the pressure in said brake pipe, and comprising:

brake pipe monitoring means for monitoring the change in pressure in said brake pipe in response to a request for an application of the train's brakes; and control means, coupled to said brake pipe monitoring means and responsive to the pressure within said brake pipe not reaching a preselected condition, for causing a further reduction in the value of said pressure reference parameter and, in response to the pressure within said brake pipe reaching a preselected condition as a result of said further reduction, for storing a pressure reference value equal to the current value of the pressure reference parameter, and causing the value of pressure reference parameter to be further changed to an amount corresponding to said requested reduction modified by the difference between a preestablished pressure reference parameter value and said stored pressure reference value, whereby the pressure in said fluid line is caused to be reduced by an amount corresponding to said requested reduction.

32. A control apparatus according to claim 31, wherein said control means comprises means for causing the value of the pressure reference parameter to be changed to an amount corresponding to the total of said requested reduction and the difference between the maximum value to which the pressure reference parameter is set and said stored pressure reference value.

33. A control apparatus according to claim 31, wherein said brake pipe monitoring means comprises means for monitoring the flow rate of braking control fluid flowing into said brake pipe, and said control means comprises means for storing the value of the pressure reference parameter upon said flow rate being reduced to a preselected value.

* * * * *